(12) United States Patent
Kuo

(10) Patent No.: US 9,176,283 B2
(45) Date of Patent: Nov. 3, 2015

(54) OPTICAL FIBER CONNECTOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 370 days.

(21) Appl. No.: 13/726,674

(22) Filed: Dec. 26, 2012

(65) Prior Publication Data

US 2014/0086538 A1  Mar. 27, 2014

(30) Foreign Application Priority Data

Sep. 27, 2012 (TW) .............................. 101135630 A

(51) Int. Cl.
G02B 6/36 (2006.01)
G02B 6/38 (2006.01)

(52) U.S. Cl.
CPC ............ *G02B 6/3636* (2013.01); *G02B 6/3885* (2013.01); *G02B 6/3652* (2013.01); *G02B 6/3672* (2013.01); *G02B 6/3861* (2013.01)

(58) Field of Classification Search
CPC .. G02B 6/4249; G02B 6/3839; G02B 6/3885; G02B 6/3861; G02B 6/3838; G02B 6/3636; G02B 6/3652; G02B 6/3672
See application file for complete search history.

(56) References Cited

U.S. PATENT DOCUMENTS

| 6,398,424 | B1 * | 6/2002 | Jin et al. .......................... 385/83 |
| 6,550,980 | B2 * | 4/2003 | Schofield et al. ............... 385/83 |
| 6,554,493 | B2 * | 4/2003 | Melchior et al. ............... 385/89 |
| 8,622,628 | B2 * | 1/2014 | Yu et al. .......................... 385/74 |
| 2002/0146216 | A1 * | 10/2002 | Schofield et al. ............... 385/83 |
| 2003/0091297 | A1 * | 5/2003 | Hung et al. ..................... 385/83 |
| 2003/0174998 | A1 * | 9/2003 | Shevchuk ..................... 385/137 |
| 2014/0010499 | A1 * | 1/2014 | Suematsu et al. ............... 385/65 |
| 2014/0086538 | A1 * | 3/2014 | Kuo ............................... 385/89 |
| 2014/0205238 | A1 * | 7/2014 | Kuo ............................... 385/39 |
| 2014/0205247 | A1 * | 7/2014 | Kuo ............................... 385/89 |

* cited by examiner

*Primary Examiner* — Rhonda Peace
(74) *Attorney, Agent, or Firm* — Novak Druce Connolly Bove + Quigg LLP

(57) ABSTRACT

An optical fiber connector includes a connector body, first optical fibers each including a first main portion and a concentric first front portion, and a first cover. The connector body includes a front surface, a rear surface, an upper surface, a top recess, a first bottom surface in the top recess, and two first receiving recesses. The first bottom surface defines first receiving grooves each first receiving groove has a first receiving groove portion and a second receiving groove portion. The first receiving recesses are positioned at opposite sides of the top recess and communicate with the top recess. The first cover is received in the top recess and the first receiving recesses, the first cover and the first receiving groove portions cooperatively securely retain the first front portions in the first receiving groove portions, and the first main portions are fixed in second receiving groove portions.

20 Claims, 5 Drawing Sheets

OPTICAL FIBER CONNECTOR

BACKGROUND

1. Technical Field

The present disclosure relates to optics and, particularly, to an optical fiber connector.

2. Description of Related Art

An optical fiber connector is preferred for use in data transmission between electronic devices due to its high transmission speed and signal integrity. The optical fiber connector includes a connector body, optical fibers, blind holes defined in the connector body for receiving the optical fibers, and optical lenses aligned with the respective blind holes.

When the optical fiber connector is assembled, the optical fibers are inserted into the respective blind holes. However, it is difficult to insert the optical fibers into the blind holes because the optical fibers are long and thin, and the optical fibers are easily broken.

Therefore, it is desirable to provide an optical fiber connector, which can overcome or at least alleviate the limitations described.

DETAILED DESCRIPTION

Figure 1:
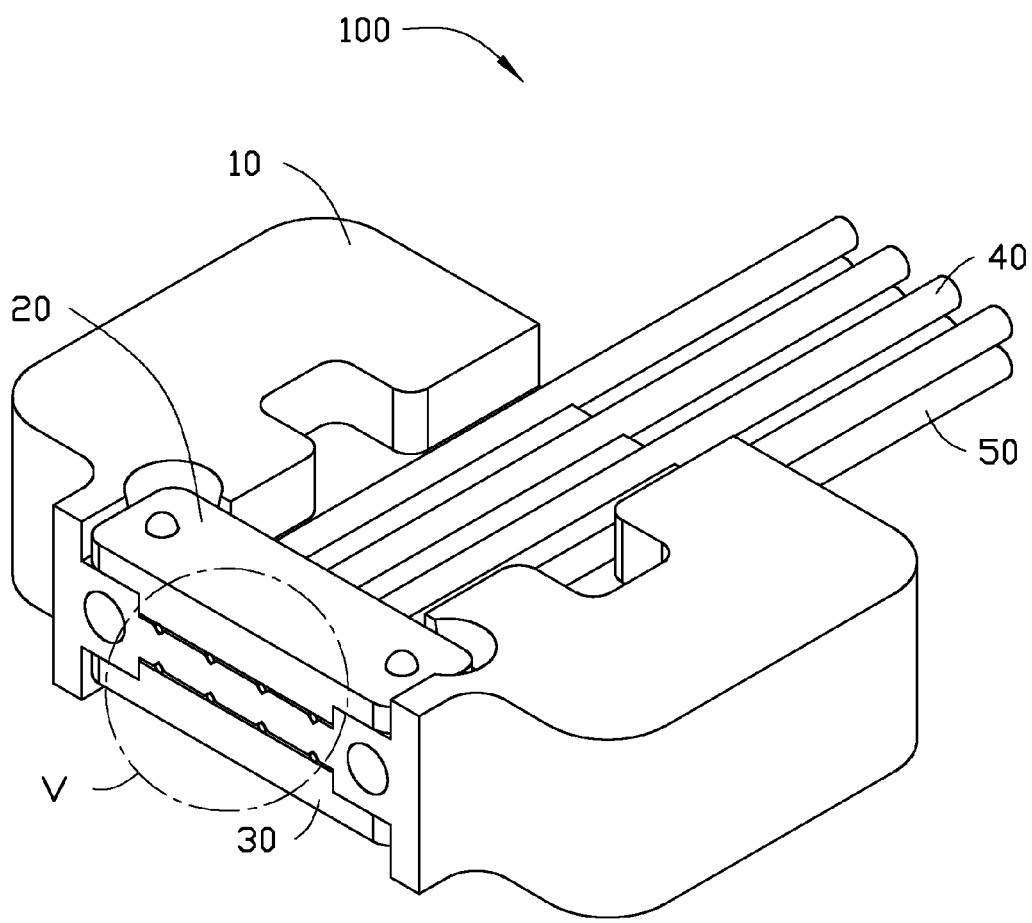
FIG. 1 is a schematic, isometric view of an optical fiber connector including a connector body, according to an exemplary embodiment.

FIG. 1 shows an optical fiber connector 100 according to an exemplary embodiment. The optical fiber connector 100 includes a connector body 10, a first cover 20, a second cover 30, four first optical fibers 40, and four second optical fibers 50.

Figure 2:
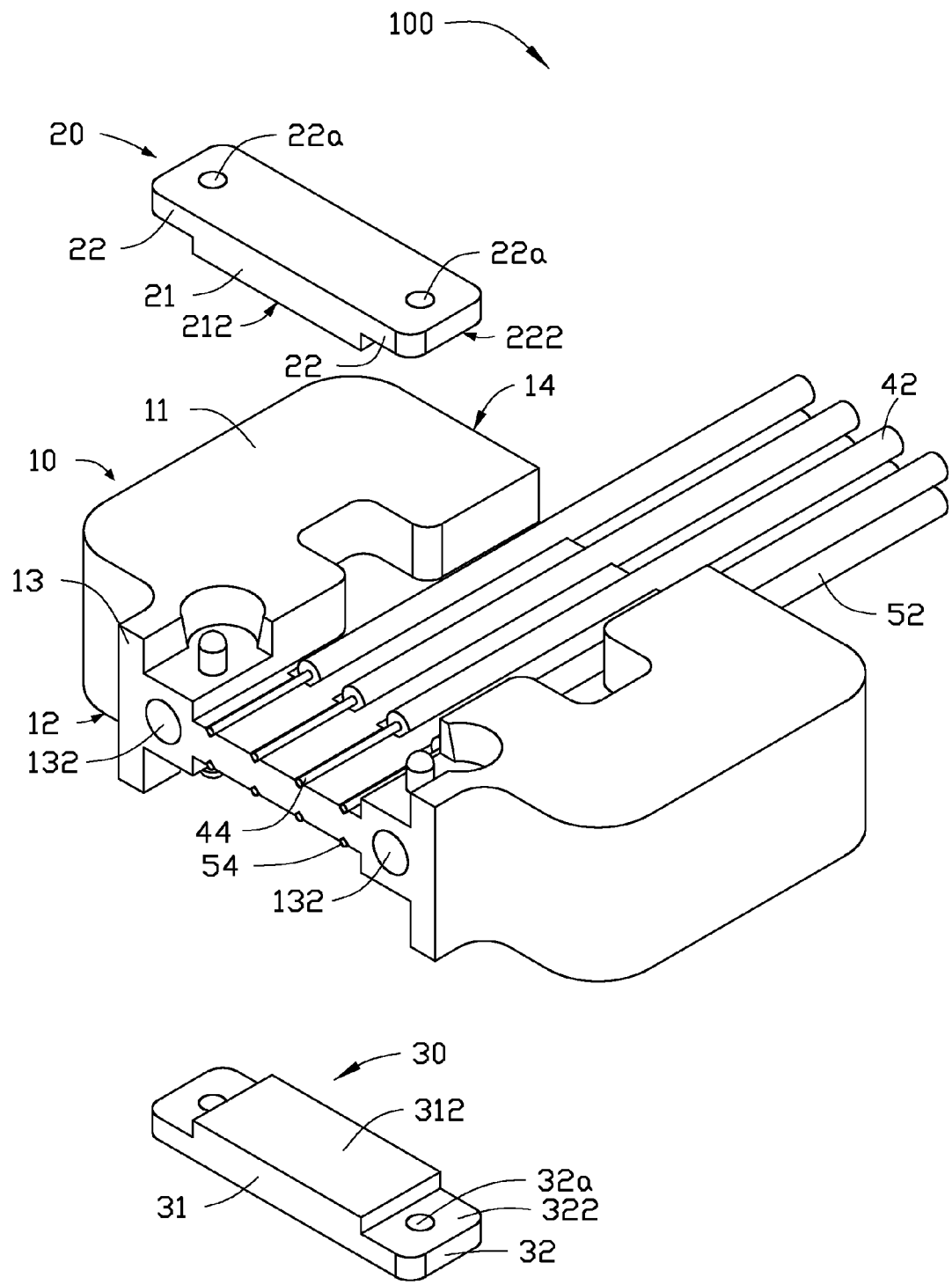
FIG. 2 is an exploded view of the optical fiber connector of FIG. 1.

Referring to FIG. 2, the connector body 10 is substantially cuboid. The connector body 10 includes an upper surface 11, a lower surface 12, a front surface 13, and a rear surface 14. The upper surface 11 is substantially parallel to the lower surface 12. The front surface 13 is substantially parallel to the rear surface 14. The upper surface 11 and the lower surface 12 are perpendicularly interconnected between the front surface 13 and the rear surface 14.

Figure 3:
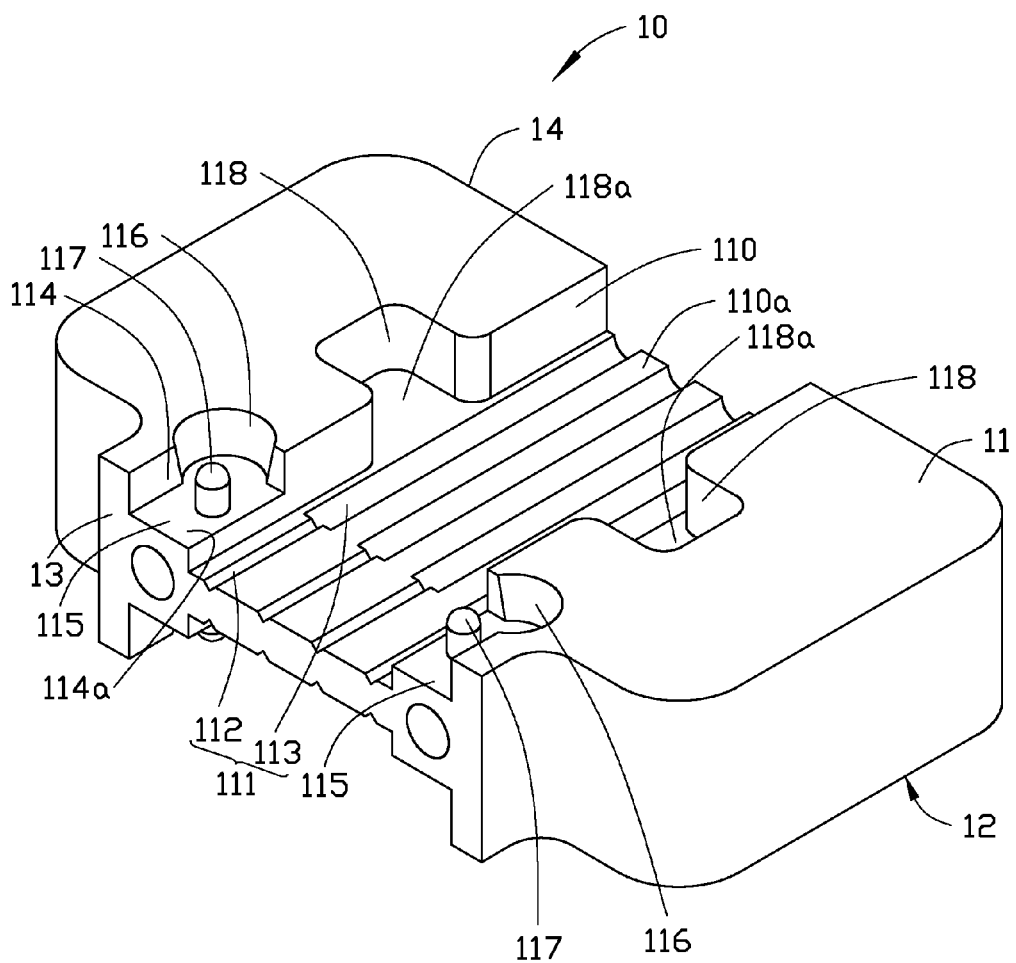
FIG. 3 is a schematic, isometric view of the connector body of FIG. 1.

Referring to FIG. 3, a top recess 110, two first receiving recesses 114, and two first extending recesses 118 are defined in the upper surface 11.

Figure 5:
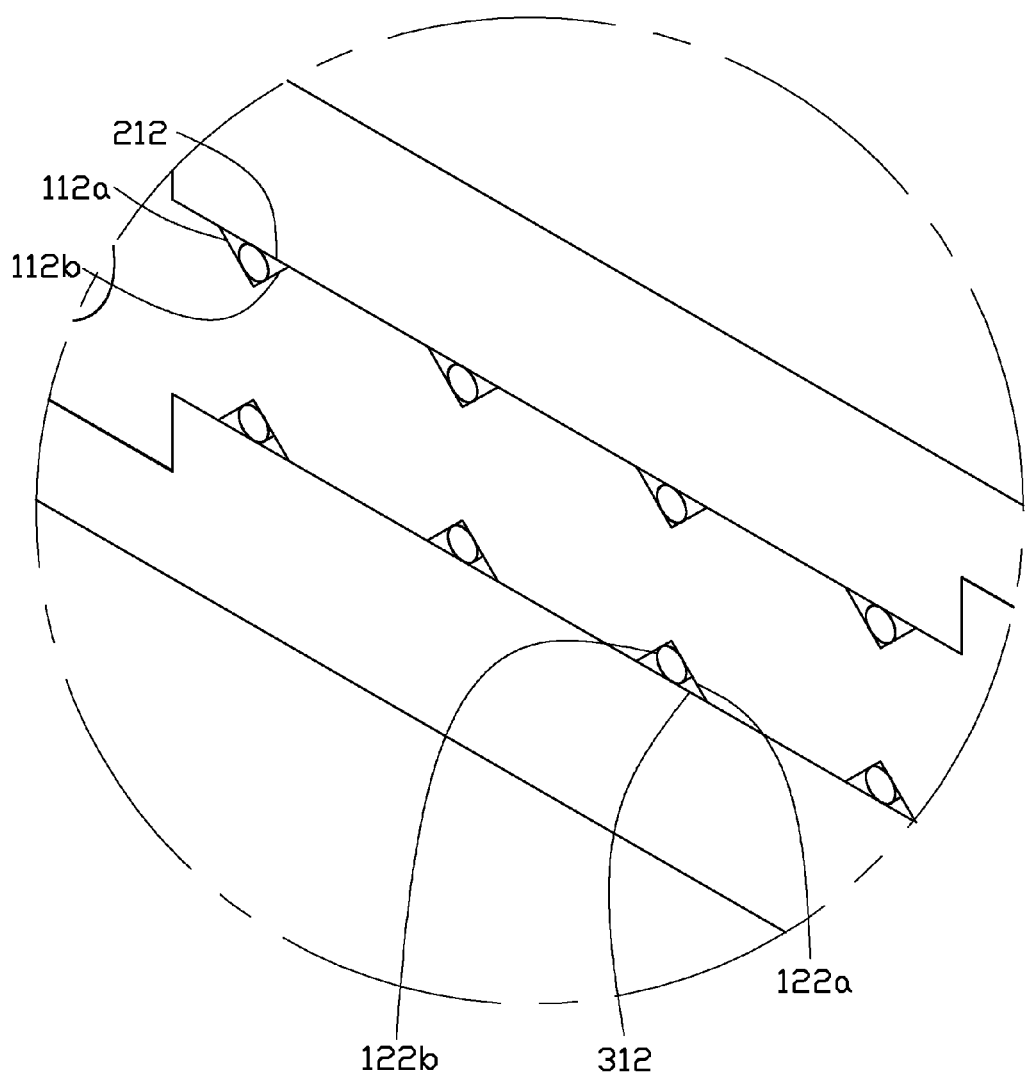
FIG. 5 is an enlarged view of section V of the optical fiber connector of FIG. 1.

The top recess 110 is substantially rectangular and passes through the front surface 13 and the rear surface 14. The top recess 110 includes a first bottom surface 110a parallel to the upper surface 11. The first bottom surface 110a defines four first receiving grooves 111 for receiving the four first optical fibers 40, which pass through the front surface 13 and the rear surface 14. Each first receiving groove 111 includes a first receiving groove portion 112 and a second receiving groove portion 113 communicating with the first receiving groove portion 112. The first receiving groove portion 112 and the second receiving groove portion 113 are arranged in that order from the front surface 13 to the rear surface 14. In this embodiment, the first receiving groove portions 112 are V-shaped in cross-section, and the second receiving groove portions 113 are semicircular in cross-section. Referring to FIG. 5, each of the first receiving groove portions 112 includes a first slanted surface 112a and a second slanted surface 112b. The first slanted surface 112a is obliquely connected to the second slanted surface 112b.

Referring to FIG. 3, the first receiving recesses 114 are arranged at opposite sides of the top recess 110 and communicate with the top recess 110. The first receiving recesses 114 are adjacent to the front surface 13. In this embodiment, the first receiving recesses 114 are symmetric with each other relative to the top recess 110, and each of the first receiving recesses 114 passes through the front surface 13. Each of the first receiving recesses 114 includes a second bottom surface 114a, a first cover receiving portion 115, and a first glue receiving portion 116 communicating with the first cover receiving portion 115. Each of the second bottom surfaces 114a is higher than that of the first bottom surface 110a. That is, the depth of each of the first receiving recesses 114 is smaller than that of the top recess 110. Each of the first cover receiving portions 115 is interconnected between the corresponding first glue receiving portion 116 and the top recess 110. Two first posts 117 extend from the second bottom surface 114a in the first cover receiving portion 115. The first glue receiving portions 116 are configured for receiving two first glue layers.

The first extending recesses 118 are arranged at opposite sides of the top recess 110 and communicate with the top recess 110. The first extending recesses 118 are adjacent to the rear surface 13. In this embodiment, the first extending recesses 118 are symmetric with each other relative to the top recess 110. A bottom surface 118a of each of the first extending recesses 118 is coplanar with the first bottom surface 110a. The first extending recesses 118 are configured for receiving two second glue layers.

Figure 4:
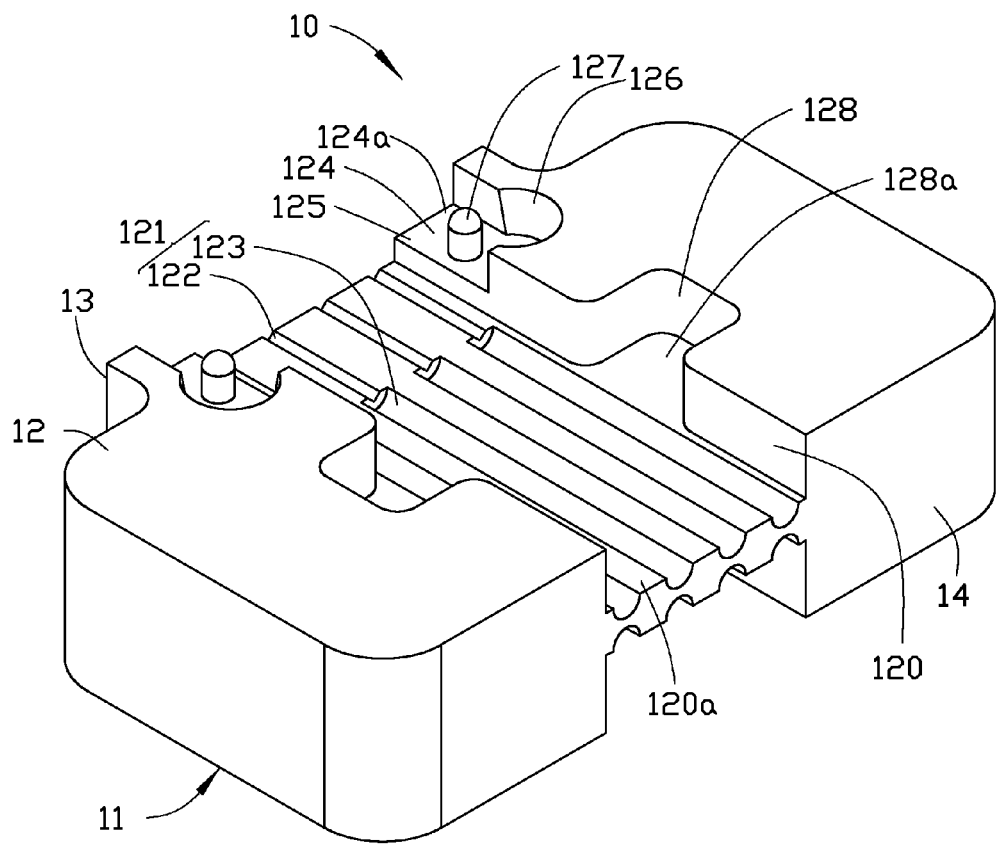
FIG. 4 is similar to FIG. 3, but viewed from another aspect.

Referring to FIG. 4, the structure of the upper surface 11 is the same as that of the lower surface 12. In detail, a bottom recess 120, two second receiving recesses 124, and two second extending recesses 128 are defined in the lower surface 12.

The bottom recess 120 is substantially rectangular and passes through the front surface 13 and the rear surface 14. The bottom recess 120 includes a third bottom surface 120a parallel to the lower surface 12. The third bottom surface 120a defines four second receiving grooves 121 for receiving the four second optical fibers 50, which pass through the front surface 13 and the rear surface 14. Each second receiving groove 121 includes a third receiving groove portion 122 and a fourth receiving groove portion 123 communicating with the third receiving groove portion 122. The third receiving groove portion 122 and the fourth receiving groove portion 123 are arranged in that order from the front surface 13 to the rear surface 14. In this embodiment, the third receiving groove portions 122 are V-shaped in cross-section, and the fourth receiving groove portions 123 are semicircular in cross-section. Referring to FIG. 5, each of the third receiving groove portions 122 includes a third slanted surface 122a and a fourth slanted surface 122b. The third slanted surface 122a is obliquely connected to the fourth slanted surface 122b.

The second receiving recesses 124 are arranged at opposite sides of the bottom recess 120 and communicate with the bottom recess 120. The second receiving recesses 124 are adjacent to the front surface 13. In this embodiment, the second receiving recesses 124 are symmetric with each other relative to the bottom recess 120, and each of the second receiving recesses 124 passes through the front surface 13. Each of the second receiving recesses 124 includes a fourth bottom surface 124a, a second cover receiving portion 125, and a second glue receiving portion 126 communicating with the second cover receiving portion 125. Each of the fourth bottom surfaces 124a is higher than that of the third bottom surface 120a. That is, the depth of each of the second receiving recesses 124 is smaller than that of the bottom recess 120. Each of the second cover receiving portions 125 is interconnected between the corresponding second glue receiving portion 126 and the bottom recess 120. Two second posts 127 extend from the fourth bottom surface 124a in the second cover receiving portion 125. The second glue receiving portions 126 are configured for receiving two third glue layers.

The second extending recesses 128 are arranged at opposite sides of the bottom recess 120 and communicate with the bottom recess 120. The second extending recesses 128 are adjacent to the rear surface 13. In this embodiment, the second extending recesses 128 are symmetric with each other relative to the bottom recess 120. A bottom surface 128a of each of the second extending recesses 128 is coplanar with the third bottom surface 120a. The second extending recesses 128 are configured for receiving two fourth glue layers.

Referring to FIGS. 2-4, two locating holes 132 are defined in the front surface 13 and apart from each other. The top recess 110 and the bottom recess 120 are arranged between the two locating holes 132.

The first cover 20 is shaped to be received in the top recess 110 and the two first cover receiving portions 115 with the first glue layers. The first cover 20 may be made of a material which does not impede ultraviolet light so that ultraviolet light can be used to cure all the first glue layers used. The insertion direction of the first cover 20 is substantially perpendicular to a longitudinal axis of each of the first receiving grooves 111.

In detail, the first cover 20 includes a first main body 21 and two first flanges 22 extending from opposite sides of the first main body 21. The first main body 21 is substantially cuboid and includes a first planar surface 212. Each of the first flanges 22 includes a first engagement surface 222 and defines a first engagement hole 22a corresponding to the first post 117. Each of he first engagement hole 22a may be a blind hole or a through hole. In this embodiment, each of the first engagement hole 22a is a through hole.

The second cover 30 is shaped to be received in the bottom recess 120 and the two second cover receiving portions 125 with the third glue layers. The second cover 30 may be made of a material which does not impede ultraviolet light so that ultraviolet light can be used to cure all the third glue layers used. The insertion direction of the second cover 30 is substantially perpendicular to a longitudinal axis of each of the second receiving grooves 121.

The structure of the second cover 30 is the same as that of the first cover 20. In detail, the second cover 30 includes a second main body 31 and two second flanges 32 extending from opposite sides of the second main body 31. The second main body 31 is substantially cuboid and includes a second planar surface 312. Each of the second flanges 32 includes a second engagement surface 322 and defines a second engagement hole 32a corresponding to the second post 127. Each of he second engagement hole 32a may be a blind hole or a through hole. In this embodiment, each of the second engagement hole 32a is a through hole.

The first optical fibers 40 are received in the respective first receiving grooves 111. Each of the first optical fibers 40 includes a first main portion 42 which is substantially circular in cross-section, and a concentric first front portion 44. The first main portion 42 consists of a core portion and a cladding portion surrounding the core portion. The first front portion 44 consists of the core portion exposed, and the first front portion 44 has a certain critical length. Each of the first receiving groove portions 112 is sized to match the first front portion 44 and is configured for receiving the first front portion 44. Each of the second receiving groove portions 113 conforms to the first main portion 42 and is configured for receiving the first main portion 42.

The second optical fibers 50 are received in the respective second receiving grooves 121. Each of the second optical fibers 50 includes a second main portion 52 which is substantially circular in cross-section, and a concentric second front portion 54. The second main portion 52 consists of a core portion and a cladding portion surrounding the core portion. The second front portion 52 consists of the core portion exposed, and the second front portion 54 has a certain critical length. Each of the third receiving groove portions 122 is sized to match the second front portion 54 and is configured for receiving the second front portion 54. Each of the fourth receiving groove portions 123 conforms to the second main portion 52 and is configured for receiving the second main portion 52.

Referring to FIGS. 1-5, when the first optical fibers 40 are fixed in the top recess 110, first, the first optical fibers 40 are placed in the respective first receiving grooves 111 from top to bottom. In particularly, each of the first front portions 44 is received in the corresponding first receiving groove portion 112, and each of the first main portions 42 is received in the corresponding second receiving groove portion 113. Second, the first cover 20 is inserted into the connector body 10. The first flanges 22 are received in the respective first receiving recesses 114, and the first main body 21 is received in the top recess 110. In detail, the first posts 117 engage in the respective first engagement holes 22a, each of the first engagement surfaces 222 contacts the corresponding second bottom surface 114a, and the first planar surface 212, the first slanted surface 112a, and the second slanted surface 112b cooperatively and securely retain the first front portion 44 of each of the first optical fibers 40 in the corresponding first receiving groove portion 112. That is, the outer surface of the first front portion 44 is in contact with the first planar surface 212. Third, the first glue layers are dispersed on the first cover 20, thereby the first cover 20 is fixed in place. Fourth, the second glue layers are dispersed on the first main portions 42, thereby the first main portions 42 are fixed in the second receiving groove portions 113. Thus the first optical fibers 40 are fixed in the top recess 110. During the process, inserting the first optical fibers 40 into blind holes is avoided, thereby the first optical fibers 40 can be easily and safely fixed in the connector body 10. In addition, if the first glue layers and the second glue layers are excessive, the excess of the first glue layers flows into the first glue receiving portions 116, and the excess of the second glue layers flows into the first extending recesses 118.

When the second optical fibers 50 are fixed in the bottom recess 120, first, the second optical fibers 50 are placed in the respective second receiving grooves 121 from top to bottom. In particularly, each of the second front portions 54 is received in the corresponding third receiving groove portion 122, and each of the second main portions 52 is received in the corresponding fourth receiving groove portion 123. Second, the second cover 30 is inserted into the connector body 10. The second flanges 32 are received in the respective second receiving recesses 124, and the second main body 31 is received in the bottom recess 120. In detail, the second post 127 engages in the respective second engagement hole 32a, each of the second engagement surfaces 322 contacts the corresponding fourth bottom surface 124a, and the second planar surface 312, the third slanted surface 122a, and the fourth slanted surface 122b cooperatively and securely retain the second front portion 54 of each of the second optical fibers 50 in the corresponding third receiving groove portion 122. That is, the outer surface of the second front portion 54 is in contact with the second planar surface 312. Third, the third glue layers are dispersed on the second cover 30, thereby the second cover 30 is fixed in place. Fourth, the fourth glue layers are dispersed on the second main portions 52, thereby the second main portions 52 are fixed in the fourth receiving groove portions 123. Thus the second optical fibers 50 are fixed in the bottom recess 120. The process of inserting the second optical fibers 50 into blind holes is avoided, thereby the second optical fibers 50 can be easily and safely fixed in the connector body 10. In addition, if the third glue layers and the fourth glue layers are excessive, the excess of the third glue layers flows into the second glue receiving portions 126, and the excess of the fourth glue layers flows into the second extending recesses 128.

Even though numerous characteristics and advantages of the present embodiments have been set forth in the foregoing description, together with details of the structures and functions of the embodiments, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An optical fiber connector, comprising:
    a connector body comprising a front surface, an opposing rear surface parallel to the front surface, an upper surface perpendicularly interconnected between the front surface and the rear surface, the connector body including a top recess defined in the upper surface, a first bottom surface in the top recess parallel to the upper surface, two first receiving recesses defined in the upper surface, and a second bottom surface in each of the first receiving recesses, the first bottom surface defining a plurality of first receiving grooves passing through the front surface and the rear surface, each of the first receiving grooves having a first receiving groove portion and a second receiving groove portion arranged in order from the front surface to the rear surface, the first receiving recesses positioned at opposite sides of the top recess and communicating with the top recess, the first receiving recesses exposed at the front surface, each of the first receiving recesses comprising a first cover receiving portion passing through the front surface and a first glue receiving portion being away from the front surface, each of the first glue receiving portions having a curved side surface, each of the first glue receiving portions communicating with the top recess through the corresponding first cover receiving portion, the second bottom surface being raised relative to the first bottom surface;
    a plurality of first optical fibers, each of the first optical fibers comprising a first main portion consisting a core portion and cladding portion surrounding the core portion, and a concentric first front portion consisting of an exposed core portion proximate to the first main portion; and
    a first cover engagingly received in the top recess and the first cover receiving portions of the first receiving recesses, a gap formed between the curved side surface and two neighboring side surfaces of the first cover, the first cover and the first receiving groove portions cooperatively securely retaining the first front portions of the first optical fibers in the first receiving groove portions, and the first main portions fixed in second receiving groove portions with adhesive.

2. The optical fiber connector as claimed in claim 1, wherein each of the first receiving groove portion has a V-shaped cross-section, a first slanted surface, and a second slanted surface, the first cover includes a first planar surface, and the first slanted surface, the second slanted surface, and the first planar surface cooperatively securely retain the first front portions of the first optical fibers in the top recess.

3. The optical fiber connector as claimed in claim 2, wherein the outer surface of each of the first front portion is in contact with the first planar surface.

4. The optical fiber connector as claimed in claim 3, wherein the first planar surface is coplanar with the first bottom surface.

5. The optical fiber connector as claimed in claim 2, wherein the first cover comprises a first main body and two first flanges extend from opposite sides of the first main body, the first main body is received in the top recess and has the first planar surface, and the first flanges are received in the respective first cover receiving portions.

6. The optical fiber connector as claimed in claim 5, wherein each of the first flanges comprises a first engagement surface and a first engagement hole defined in the first engagement surface, a first post extends from the second bottom surface in each of the first cover receiving portions, the first posts engages in the respective first engagement holes, and the first engagement surfaces contact the second bottom surfaces.

7. The optical fiber connector as claimed in claim 6, wherein two first extending recesses are defined in the upper surface, the first extending recesses are arranged at opposite sides of the top recess and communicate with the top recess.

8. The optical fiber connector as claimed in claim 7, wherein the first receiving recesses are symmetrical with each other relative to the top recess, and the first extending recesses are symmetrical with each other relative to the top recess.

9. The optical fiber connector as claimed in claim 7, wherein each of the first extending recesses is located between the first receiving recess and the rear surface.

10. The optical fiber connector as claimed in claim 9, wherein a bottom surface of each of the first extending recesses is coplanar with the first bottom surface.

11. The optical fiber connector as claimed in claim 6, wherein the connector body further comprises a lower surface parallel to the upper surface and perpendicularly interconnected between the front surface and the rear surface, the connector body including a bottom recess defined in the lower surface, a third bottom surface in the bottom recess parallel to the lower surface, two second receiving recesses defined in the lower surface, and a fourth bottom surface in each of the fourth receiving recesses, the third bottom surface defining a plurality of second receiving grooves passing through the front surface and the rear surface, each of the second receiving grooves having a third receiving groove portion and a fourth receiving groove portion arranged in order from the front surface to the rear surface, the second receiving recesses positioned at opposite sides of the bottom recess and communicating with the bottom recess, the fourth bottom surface being raised relative to the third bottom surface; the optical fiber connector further comprises a plurality of second optical fibers and a second cover, each of the second optical fibers comprising a second main portion consisting a core portion and cladding portion surrounding the core portion, and a concentric second front portion consisting of an exposed core portion proximate to the second main portion, the second cover engagingly received in the bottom recess and the second receiving recesses, the second cover and the second receiving groove portions cooperatively securely retaining the second front portions of the second optical fibers in the third receiving groove portions, and the second main portions fixed in fourth receiving groove portions with adhesive.

12. The optical fiber connector as claimed in claim 11, wherein each of the third receiving groove portion has a V-shaped cross-section, a third slanted surface, and a fourth slanted surface, the second cover includes a second planar surface, and the third slanted surface, the fourth slanted surface, and the second planar surface cooperatively securely retain the second front portions of the second optical fibers in the top recess.

13. The optical fiber connector as claimed in claim 12, wherein the outer surface of each of the second front portion is in contact with the second planar surface.

14. The optical fiber connector as claimed in claim 12, wherein each of the second receiving recesses comprises a second cover receiving portion and a second glue receiving portion, each of the second glue receiving portions communicating with the bottom recess through the corresponding second cover receiving portion, the second cover comprises a second main body and two second flanges extend from opposite sides of the second main body, the second main body is received in the bottom recess and has the second planar surface, and the second flanges are received in the respective second cover receiving portions.

15. The optical fiber connector as claimed in claim 14, wherein each of the second flanges comprises a second engagement surface and a second engagement hole defined in the second engagement surface, a second post extends from the third bottom surface in each of the second cover receiving portions, the second posts engages in the respective second engagement holes, and the second engagement surfaces contact the third bottom surfaces.

16. The optical fiber connector as claimed in claim 15, wherein two second extending recesses are defined in the lower surface, the second extending recesses are arranged at opposite sides of the bottom recess and communicate with the bottom recess.

17. The optical fiber connector as claimed in claim 16, wherein the second receiving recesses are symmetrical with each other relative to the bottom recess, and the second extending recesses are symmetrical with each other relative to the bottom recess.

18. The optical fiber connector as claimed in claim 16, wherein each of the second extending recesses is located between the second receiving recess and the rear surface.

19. The optical fiber connector as claimed in claim 14, wherein the second receiving recesses are exposed at the front surface, each first cover receiving portion passes through the front surface, each first glue receiving portion faces away from the front surface, each of the first glue receiving portions has a curved side surface, and a gap is formed between the curved side surface of the first glue receiving portion and two neighboring side surfaces of the second cover.

20. The optical fiber connector as claimed in claim 12, wherein the second planar surface is coplanar with the second bottom surface.

* * * * *